March 13, 1951     T. A. RICH     2,545,386

COMPENSATION CIRCUIT FOR ELECTROSTATIC VOLTMETERS

Filed April 28, 1949

Inventor:
Theodore A. Rich,
by Richard E. Hosley
His Attorney.

Patented Mar. 13, 1951

2,545,386

UNITED STATES PATENT OFFICE 2,545,386

COMPENSATION CIRCUIT FOR ELECTROSTATIC VOLTMETERS

Theodore A. Rich, Schenectady, N. Y., assignor to General Electric Company, a corporation of New York Application April 28, 1949, Serial No. 90,169

1 Claim. (Cl. 250—83.6)

My invention relates to electrostatic voltmeters and more particularly to compensation of such voltmeters for variation in associated capacitance when employed to measure potentials of pocket ionization chambers and the like.

In the determination of the amount of nuclear radiation to which persons have been exposed during a given period of time, use is frequently made of pocket ionization chambers which may be attached to clothing and carried about in a radiation area. Such an ionization chamber may take the form of a capacitor having, for example, a hollow conducting tube as one electrode, and a metallic rod suspended therein by an insulator as the other electrode. It has been found that if such a capacitor is charged to a particular voltage and subsequently exposed to nuclear radiation, the reduction of the capacitor voltage over a period of time may be considered as indicative of the amount of radiation to which the ionization chamber and the individual carrying it about have been exposed during the period of exposure.

For initially charging an ionization chamber and subsequently measuring the residual charge thereon, a receptacle or well, arranged to receive the chamber in mating engagement, may be conveniently employed, and in itself constitutes a capacitor. The well serves as convenient terminals for an electrometer.

While such wells are frequently employed in the manner noted, difficulty has been experienced in the use thereof due to "zero-shift" or change in the voltage across the electrometer following the removal of a pocket ionization chamber therefrom, due to change in the capacitance of the well. It is the principal object of my invention to provide a new and improved arrangement to compensate electrometers or electrostatic voltmeters for such changes in capacitance when employed in the measurements of voltages of pocket ionization chambers and the like.

In its broadest aspect, my invention provides an equipotential surface, suitably positioned within a well of the type mentioned and provided with an adjustable potential, to permit adjustment of the effective capacitance of the well when an ionization chamber is not positioned therein.

Figure 1:
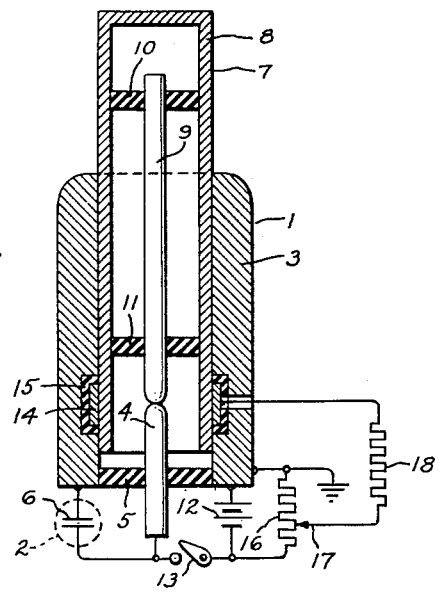
Figure 2:
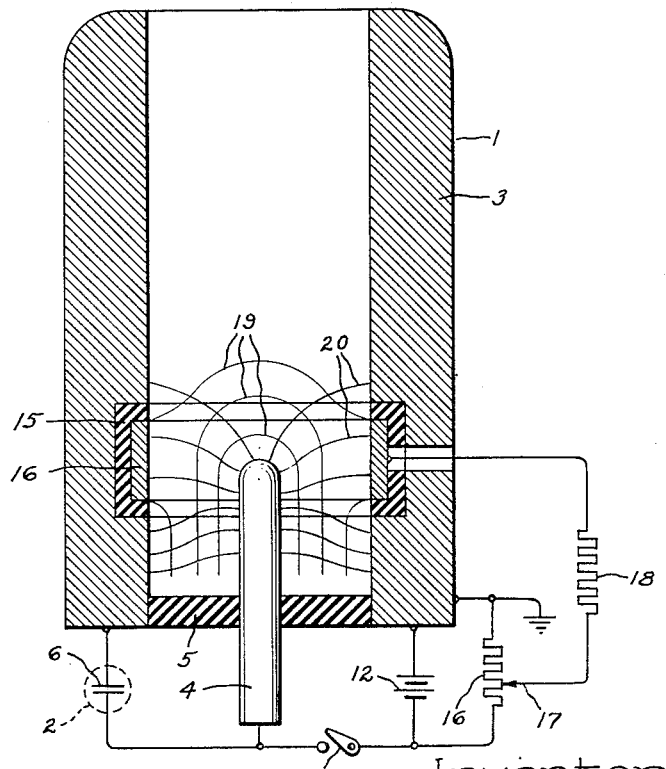

For a better understanding of my invention, attention is now directed to the following description and the figures of the accompanying drawing in which Fig. 1 represents a receptacle having a pocket ionization chamber positioned therewithin, while Fig. 2 represents an enlarged view of the same arrangement without a pocket ionization chamber.

Referring now to Fig. 1, there is shown a receptacle or well 1 connected to the terminals of an associated electrostatic voltmeter 2. Well 1 comprises essentially a pair of electrodes represented as an outer tubular shell 3 and an inner rod 4, both formed of a highly conductive material such as metal. Rod 4 is positioned at the approximate axial center of shell 3 and is electrically insulated therefrom by an insulating member 5 which may also serve to support rod 4 with respect to shell 3. Electrostatic voltmeter 2, represented by an equivalent capacitor 6, is provided with suitable associated detecting and indicating devices which are not shown. One terminal of capacitor 6 is connected to shell 3 and the other terminal thereof is connected to rod 4.

Well 1 is arranged to receive in mating engagement an electrical device such as a pocket ionization chamber 7 comprising an outer tubular shell 8 and an inner rod 9, both formed of a conductive material, rod 9 being separated from shell 8 by a pair of insulators 10 and 11. For ease of construction, shells 3 and 8 are preferably cylindrical in cross-section and rods 4 and 9, respectively, are located concentrically therewithin. The inner diameter of shell 3 and the outer diameter of shell 8 are arranged so that ionization chamber 7 may be readily placed in sliding engagement with well 3, at the same time electrical contact being made therebetween.

In Fig. 1, ionization chamber 7 is shown positioned within well 1. In particular, ionization chamber 7 is inserted in well 1 to a degree causing touching engagement and electrical contact between rods 4 and 9. In such a position, ionization chamber 7, if previously uncharged, may be electrically charged, or, if previously charged, the degree of such charge may be measured. To charge ionization chamber 7, a source of potential or voltage such as a battery 12 is provided, one terminal of battery 12 being connected to shell 3 and the other terminal thereof being connected to rod 4 through a switch 13. As switch 13 is momentarily closed, the potential of battery 12 is impressed across the combined capacitance of well 1 and ionization chamber 7, and capacitance 6 of electrostatic voltmeter 2. The combined capacitor formed by chamber 7 and well 1 is thereby charged to the voltage of battery 12. Capacitance 6 of voltmeter 2 is likewise charged by battery 12 and the voltage thereof is indicated by electrostatic voltmeter 2.

After being charged as described, ionization chamber 7 may be removed from well 1 and employed in its normal manner to detect exposure to nuclear radiation. As is well known by those skilled in the art, if an ionization chamber, such as chamber 7, is exposed to nuclear radiations and the like, the voltage to which the chamber is initially charged will be lessened in proportion to the total amount of such radiation encountered during the period of exposure. Consequently, it is desirable to measure the voltage of the chamber at the end of a period of exposure to determine the degree of exposure.

The measurement of the voltage of the ionization chamber may be made most conveniently by positioning it once again in the well where the initial charging thereof was effected and measuring the voltage of the chamber by the use of the electrostatic voltmeter associated with the well. In order that accurate and reliable measurements be obtained, however, it is essential that conditions with respect to the degree of charge of the well be substantially identical to the conditions obtaining at the time of charging the ionization chamber.

In particular, referring now to both Figs. 1 and 2, it is desirable that the voltage indicated by electrostatic voltmeter 2 be substantially the same before and after removal of ionization chamber 7 from well 1, after chamber 7 is charged by momentarily closing of switch 13. It will be understood, however, that after removal of chamber 7 from well 1, as shown in Fig. 2, the capacitance between rod 4 and shell 3 is considerably different from the previous combined capacitance of rods 4 and 9, and shell 8 and the portion of shell 3 extending beyond shell 8, as shown in Fig. 1. Moreover, when ionization chamber 7 is removed from well 1, a portion of the charge previously imparted to the combined capacitance of chamber 7 and well 1 remains with the capacitance comprising rod 4 and shell 3. However, the change in capacitance of well 1 and the quantity of charge associated therewith may not entirely compensate each other and, therefore, the potential difference existing between rod 4 and shell 3 (the quotient of the charge thereon divided by the capacitance thereof) may differ from the original charging voltage of battery 12.

In other words, if the voltage of battery 12 is 150 volts, then with ionization chamber 7 positioned in well 1 the combined capacitance of chamber 7 and well 1 may be charged to 150 volts, which voltage is also indicated by electrostatic voltmeter 2. When chamber 7 is removed from well 1, however, the voltage indicated by voltmeter 2 may change considerably, as described above. For example, the new potential difference between rod 4 and shell 3 may be only 148 volts. Such a change in indicated voltage is highly undesirable since, when chamber 7 is again positioned in well 1, uncertainties may exist as to the reference point of subsequent voltmeter indications. Therefore, it is highly desirable to provide an arrangement whereby the voltage indicated by voltmeter 2 remains at the initial charging value of ionization chamber 7 and well 1, for example, 150 volts, after removal of chamber 7 from well 1, and does not drop to a lower value, for example, 148 volts.

While it may be possible to arrange the configuration of rod 4 with respect to shell 3 so that self-compensation exists, or, in other words, so that the changes in capacitance and quantity of charge associated with well 1 actually compensate each other, such an arrangement is difficult to manufacture and does not permit ease of adjustment. In accordance with my invention, however, I provide an arrangement whereby compensation of well 1 is effected electrically and is readily adjustable for variable conditions. In particular, I provide an equipotential surface, having an adjustable potential, positioned along the inner surface of shell 3 near the extremity of rod 4.

In the illustrated embodiment, referring now to Fig. 2, such a surface is represented as a ring 14 positioned concentrically with respect to shell 3 and electrically insulated therefrom by an insulating spacer 15. Ring 14 is positioned axially within shell 3 so that it is approximately centered about the extremity or end of rod 4. The purpose of ring 14, when provided with a suitable potential, is to interact electrostatically with rod 4, thereby controlling the fringing effect occurring at the extremity thereof when ionization chamber 7 is not positioned in well 1, in accordance with the well-known "guarding ring" technique employed in electrometers and the like. In Fig. 2, there is shown, for conditions of the type hereinafter exemplified, a typical distribution of equipotential lines, designated by numeral 19, and electrostatic flux lines, designated by numeral 20, between shell 3, rod 4, and ring 14.

A source of potential for ring 14 may be conveniently provided by the use of a potential-dividing resistor 16 connected in parallel relation with battery 12 and having an adjustable slider 17 which may be positioned at any point along resistor 16. Ring 14 is connected to slider 17 through a current-limiting resistor 18. To effect adjustment of the potential of ring 14 to secure the desired effect as described above, the following procedure may be employed.

Ionization chamber 7 is first positioned within well 1 in a normal manner, as shown in Fig. 1, whereupon switch 13 is momentarily closed. The combined capacitance of well 1 and ionization chamber 7 is thus charged to the voltage of battery 12, assumed to be 150 volts, which is indicated by electrostatic voltmeter 2. It will be noted that when ionization chamber 7 is positioned in well 1, ring 14 is completely shielded by shell 8, and, therefore, has no effect upon the combined capacitance of chamber 7 and well 1, as shown in Fig. 1. If, after having been charged, chamber 7 is removed from well 1, a new lower voltage, for example, 148 volts, may be indicated by voltmeter 2. Slider 17 of voltage-dividing resistor 16 may then be adjusted to the voltage, for example, 37.5 volts, required to make the indication of voltmeter 2 substantially constant whether chamber 7 is positioned in well 1 or removed therefrom.

While I have shown and described a preferred embodiment of my invention, it will be understood that my invention may well take other forms and I, therefore, aim in the appended claim to cover all such changes and modifications as fall within the true spirit and scope of my invention.

What I claim as new and desire to secure by Letters Patent of the United States is:

In an electrical receptacle having a pair of main electrodes in spaced relation and electrically insulated from each other, said electrodes having capacitance, said receptacle being arranged to receive in mating engagement an electrical device having capacitance, said receptacle and said device in said engagement forming a combination having a combined capacitance, said combination being chargeable to an initial potential, said device being removable from said receptacle following said charging, said receptacle having a residual potential following removal of said device therefrom, an auxiliary electrode in spaced relation with said main electrodes and electrically insulated therefrom, said auxiliary electrode being provided with a potential with respect to said main electrodes, said potential of said auxiliary electrode being adjustable to cause said residual potential of said receptacle and said initial potential of said combination to be substantially equal.

THEODORE A. RICH.

REFERENCES CITED

The following references are of record in the file of this patent:

UNITED STATES PATENTS

| Number | Name | Date |
|---|---|---|
| 1,059,095 | Whitehead | Apr. 15, 1913 |
| 1,186,765 | Fortescue | June 13, 1916 |
| 1,289,068 | Allcutt | Dec. 31, 1918 |
| 2,067,607 | Hitchcock | Jan. 12, 1937 |
| 2,288,256 | Shepard | June 30, 1942 |